(12) United States Patent
Kang et al.

(10) Patent No.: US 9,188,729 B2
(45) Date of Patent: Nov. 17, 2015

(54) PRISM SHEET, BACKLIGHT UNIT INCLUDING THE SAME, AND METHOD OF MANUFACTURING THE SAME

(71) Applicant: Samsung Display Co., Ltd., Yongin, Gyeonggi-Do (KR)

(72) Inventors: Eui Jeong Kang, Asan-si (KR); So Jeong La, Suwon-si (KR); Rae-Young Kim, Hwaseong-si (KR); Seung-Mo Kim, Seongnam-si (KR); Young-Jun Seo, Seoul (KR); Sun Hee Oh, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 162 days.

(21) Appl. No.: 13/942,137

(22) Filed: Jul. 15, 2013

(65) Prior Publication Data

US 2014/0104870 A1   Apr. 17, 2014

(30) Foreign Application Priority Data

Oct. 15, 2012   (KR) .................. 10-2012-0114224

(51) Int. Cl.
*F21V 5/02* (2006.01)
*F21V 8/00* (2006.01)
*G02B 5/04* (2006.01)

(52) U.S. Cl.
CPC ................ G02B 6/0053 (2013.01); F21V 5/02 (2013.01); G02B 5/045 (2013.01)

(58) Field of Classification Search
CPC .. G02B 6/0038; G02B 6/0053; G02B 6/0036; F21V 5/02; F21V 5/005

USPC ........ 362/339, 620, 606; 359/625; 349/57, 64
See application file for complete search history.

(56) References Cited

U.S. PATENT DOCUMENTS

| 5,854,872 | A  | * | 12/1998 | Tai ................................ 385/133 |
| 7,072,116 | B2 |   | 7/2006  | Okuwaki et al. |
| 7,206,491 | B2 | * | 4/2007  | Feng et al. .................... 385/146 |
| 7,232,250 | B2 |   | 6/2007  | Chuang |
| 7,431,491 | B2 | * | 10/2008 | Liao .............................. 362/620 |
| 7,431,493 | B2 | * | 10/2008 | Lee ............................... 362/626 |
| 7,488,095 | B2 |   | 2/2009  | Shim et al. |
| 7,632,003 | B2 | * | 12/2009 | Noh et al. ..................... 362/620 |
| 7,898,613 | B2 | * | 3/2011  | Jung et al. ........................ 349/62 |
| 8,858,060 | B2 | * | 10/2014 | Inagaki et al. ................ 362/632 |
| 2006/0044834 | A1 | * | 3/2006 | Yu ................................. 362/620 |
| 2010/0027294 | A1 |   | 2/2010 | Lee et al. |

FOREIGN PATENT DOCUMENTS

| JP | 2006-261064 A | 9/2006 |
| JP | 2007-115451 A | 5/2007 |
| JP | 2010-122628 A | 6/2010 |
| KR | 1020030091901 A | 12/2003 |
| KR | 1020070016325 A | 2/2007 |

(Continued)

*Primary Examiner* — Peggy Neils
(74) *Attorney, Agent, or Firm* — Cantor Colburn LLP (57) ABSTRACT

A prism sheet includes: a first portion including a prism elongated in a first direction; and a second portion including a prism elongated in a second direction different from the first direction. The second direction is vertical to a light incident surface of a light guide plate of a backlight unit, a light source of the backlight unit faces the light incident surface of the light guide plate, and the prism sheet overlaps a light emitting surface of the light guide plate.

19 Claims, 10 Drawing Sheets

(56) References Cited

FOREIGN PATENT DOCUMENTS

| KR | 1020070057461 A | 6/2007 |
|---|---|---|
| KR | 1020090022182 A | 3/2009 |
| KR | 1020090027395 A | 3/2009 |
| KR | 10-0916024 B1 | 8/2009 |
| KR | 1020090090028 A | 8/2009 |
| KR | 10-1038428 B1 | 5/2011 |

* cited by examiner

PRISM SHEET, BACKLIGHT UNIT INCLUDING THE SAME, AND METHOD OF MANUFACTURING THE SAME

This application claims priority to Korean Patent Application No. 10-2012-0114224 filed on Oct. 15, 2012, and all the benefits accruing therefrom under 35 U.S.C. §119, the entire contents of which are incorporated herein by reference.

BACKGROUND (a) Field

The invention relates to a prism sheet, a backlight unit including the same, and a method of manufacturing the same.

(b) Description of the Related Art

In accordance with size and weight reductions of display devices based on a rapidly developed semiconductor technology, a demand for flat panel displays having improved performance is explosively increasing.

Among the flat panel displays, a liquid crystal display ("LCD") which has come into the limelight has advantages such as reduced size and weight, and low power consumption. Thus, the LCD has received attention as an alternative display device which overcomes drawbacks of a display device including a cathode ray tube ("CRT"), such that the LCD is mounted and used in almost all information processing devices requiring a display device.

The LCD generally includes a LCD display panel which includes a liquid crystal material between an upper substrate in which a common electrode, a color filter and the like are disposed, and a lower substrate in which a thin film transistor, a pixel electrode and the like are disposed. The LCD displays an image by applying different potentials to the pixel electrode and the common electrode to form an electric field in the liquid crystal material, thus changing the arrangement of liquid crystal molecules of the liquid crystal material to adjust transmittance of light passing through a liquid crystal layer including the liquid crystal material.

In the LCD, since the LCD panel is a non-emissive element and uses light from a separate light source, the LCD includes a backlight unit providing light to the LCD panel at a lower portion of the LCD panel. The backlight unit includes a light source, a light guide plate, a reflection sheet, optical sheets and the like.

In the backlight unit, the light source may be a fluorescent light source such as cold cathode fluorescent lamp ("CCFL"), or may adopt a light emitting diode ("LED"). Further, in the backlight unit, the light source may be positioned under the light guide plate or may be positioned adjacent to a lateral surface of the light guide plate.

SUMMARY

The invention provides a prism sheet which uniformly disperses light provided from a light source to reduce or effectively prevent occurrence of a hot spot, a backlight unit including the prism sheet, and a method of manufacturing the same.

An exemplary embodiment of the invention provides a prism sheet including: a first portion including a prism elongated in a first direction; and a second portion including a prism elongated in a second direction different from the first direction. The second direction is vertical to a light incident surface of a light guide plate of a backlight unit, and a light source of the backlight unit faces the light incident surface of the light guide plate.

The backlight unit may include long sides parallel to each other and short sides parallel to each other, and the first direction may be parallel to the long sides of the backlight unit.

The prism sheet may further include a third portion between the first portion and the second portion.

A prism structure may not in the third portion.

A prism of the second portion may extend into the third portion, and a cross-sectional height of the extended prism may decrease in a direction from the second portion toward to the first portion.

A pyramid structure may be in the third portion.

The prism sheet may overlap a light emitting surface of the light guide plate.

Another exemplary embodiment of the invention provides a backlight unit including: a light source; a light guide plate which transmits the light provided from the light source, through a light emitting surface thereof facing a display panel, and includes a light incident surface facing the light source; and a prism sheet between the light guide plate and the display panel. The prism sheet includes a first portion including a prism elongated in a first direction; and a second portion including a prism elongated in a second direction that is different from the first direction. The second direction is vertical to the light incident surface of the light guide plate.

The backlight unit may include long sides parallel to each other and short sides parallel to each other, and the first direction may be parallel to the long sides.

The prism sheet may further include a third portion between the first portion and the second portion.

A prism structure may not be the third portion.

The prism of the second portion may extend into the third portion, and a cross-sectional height of the extended prism may decrease in a direction from the second portion toward the first portion.

A pyramid structure may be in the third portion.

The backlight unit may include a plurality of light sources disposed in a line parallel to a long side of the backlight unit.

The light incident surface of the light guide plate may be inclined at a corner portion thereof.

The backlight unit may further comprise a reflection sheet which is under the light guide plate and reflects the light toward the light guide plate.

The light incident surface of the light guide plate may be inclined at a corner portion thereof.

The backlight unit may comprise long sides parallel to each other, and short sides parallel to each other, and the first direction is parallel to the long sides of the backlight unit.

The prism sheet may further comprise a third portion between the first portion and the second portion, in a plan view of the prism sheet, wherein the third portion excludes a prism structure.

According to one or more exemplary embodiment of the invention, prisms at a portion of a prism sheet are positioned at a light incident side of a backlight unit. The prisms are elongated in a direction of incident light and vertical to a light guide plate light incident surface which faces a light source of the backlight unit. The prisms disperse light at an area of the light source, thereby reducing or effectively preventing a hot spot around the light source. As a result, light is entirely uniformly dispersed on a display panel including the backlight unit, to improve image display quality.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In a backlight unit of a liquid crystal display ("LCD"), where a light source is positioned adjacent to a lateral surface of a light guide plate, light is concentrated within a predetermined distance from the light source to undesirably cause a hot spot, which is brighter than other portions. The hot spot hinders luminance of the liquid crystal display panel from being uniform, thus undesirably reducing an image display quality. Therefore, there remains a need for an improved liquid crystal display panel which reduces concentration of light from a light source, and thereby promotes uniformity of luminance and improvement of image display quality.

Hereinafter, an exemplary embodiment of a backlight unit according to the invention will be described in detail with reference to FIGS. 1 and 2.

Figure 1:
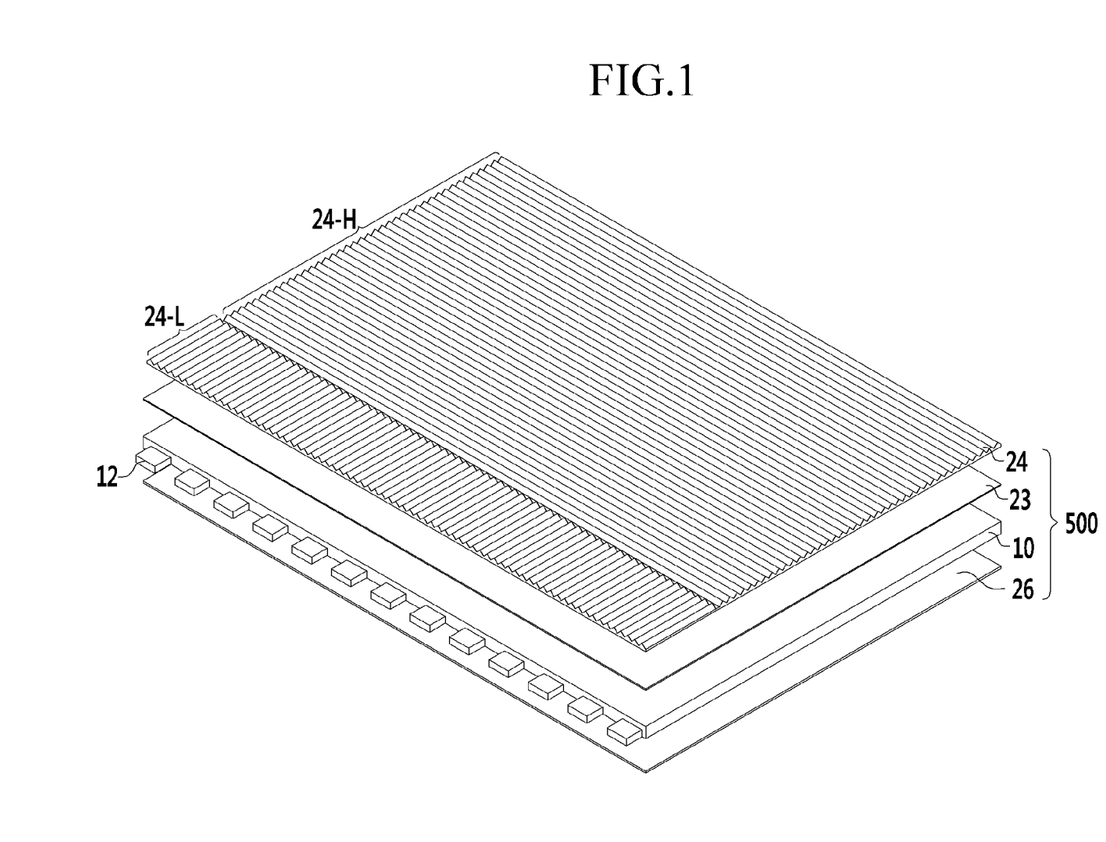
FIG. 1 is a perspective view of an exemplary embodiment of a backlight unit according to the invention.
Figure 2:
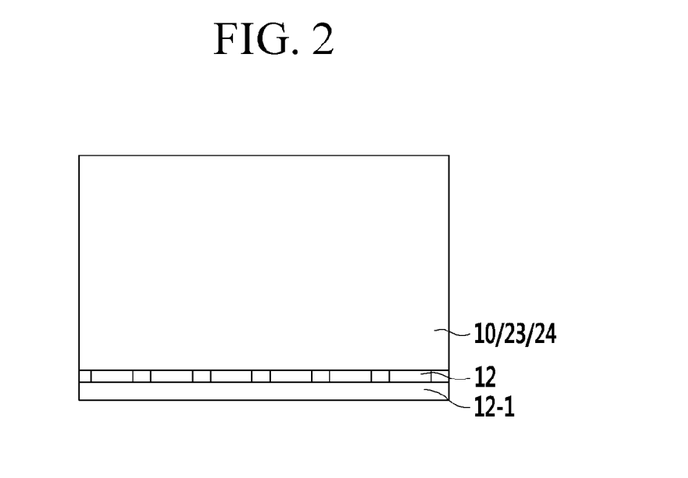
FIG. 2 is a top plan view of the backlight unit in FIG. 1.

FIG. 1 is a perspective view of an exemplary embodiment of a backlight unit according to the invention, and FIG. 2 is a top plan view of the backlight unit in FIG. 1.

The exemplary embodiment of the backlight unit 500 shown in FIG. 1 provides light to a liquid crystal display panel. The liquid crystal display panel positioned on (e.g., above) the backlight unit 500 controls light provided by the backlight unit 500 to display a grayscale, thus displaying an image.

An LCD may include a top chassis, a mold frame and a bottom chassis in order to fasten and fix the backlight unit 500 and the liquid crystal display panel to each other.

The backlight unit 500 may include various structures, and FIGS. 1 and 2 show one exemplary embodiment of the structures.

The backlight unit 500 of FIG. 1 includes one or more light source 12, a light guide plate 10, a reflection sheet 26, a prism sheet 24, and an optical sheet 23.

A light emitting diode is shown as the light source 12. However, according to an alternative exemplary embodiment, a fluorescent light source such as cold cathode fluorescent lamp ("CCFL") may be used as the light source 12.

As shown in FIGS. 1 and 2, in the illustrated exemplary embodiment, a plurality of light sources 12 are arranged in a straight line in the backlight unit 500. That is, in a plan view of the assembled backlight unit, a user will observe the plurality of light sources 12 disposed in a line at a light incident side of the backlight unit, e.g., a lower side of the view in FIG. 2.

FIG. 2 schematically shows an inverter board 12-1 which connects the plurality of light sources 12 to each other, and provides power to the plurality of light sources 12, such that the light sources 12 receive power from the inverter board 12-1 and to generate and emit light. FIG. 2 is the top plan view where the light guide plate 10, the optical sheet 23 and the prism sheet 24 of the backlight unit 500 overlap, and does not show the structure of the prism of the prism sheet 24. The structure of the prism sheet 24 is not shown because the prism structure may not be seen by the viewer at a distance from the LCD, because the prism sheet 24 includes a transparent material in practice and a prism structure may be of a relative small (e.g., fine) dimension so as not to be visible at such a distance.

The light source 12 is a member which provides light in the backlight unit 500, and light provided from the light source 12 of the backlight unit 500 is transmitted to the light guide plate 10 of the backlight unit 500.

The light guide plate 10 includes a transparent material which transmits light provided from the light source 12. The light guide plate 10 may include a pattern thereon, such as a protrusion or a groove, so that light provided from the light source 12 is reflected or refracted by the pattern of the light guide plate 10, and transmitted to an upper side of the light guide plate 10. A portion of light may be transmitted to a lower side of the light guide plate 10, and the reflection sheet 26 positioned under the light guide plate 10 may reflect the light toward the upper side of the light guide plate 10. The reflection sheet 26 may be positioned on an entire surface of the lower portion of the light guide plate 10, but is not limited thereto or thereby.

The light guide plate 10 may include a light emitting surface facing the liquid crystal display panel and through which light is transmitted to the liquid crystal display panel, and a surface opposing the light emitting surface. The light guide plate 10 may also include lateral surfaces connected the light emitting surface and the opposing surface to each other. The light source 12 may face a lateral surface of the light guide plate 10, the lateral surface being a light incident surface of the light guide plate 10.

Light passing through the light guide plate 10 and light reflected by the reflection sheet 26 may have an approximately entirely uniform distribution. However, a distribution of light is relative large and spread out at a side of the light guide plate 10 which is closer to the light source 12 in practice, and thus a hot spot may occur. Further, the distribution of light is not entirely uniform at a predetermined level or more.

In order to compensate for the non-uniform distribution of light, the prism sheet 24 and the optical sheet 23 are positioned on the upper portion of the light guide plate 10.

In the exemplary embodiment of FIG. 1, the optical sheet 23 is positioned on the upper portion of the light guide plate 10, and the prism sheet 24 is positioned on the optical sheet 23. However, the prism sheet 24 may be between the optical sheet 23 and the light guide plate 10 in an alternative exemplary embodiment.

The optical sheet 23 may include a single sheet or a plurality of sheets. The optical sheet 23 may include a luminance improving film such as a dual brightness enhancement film ("DBEF"), a diffuser sheet or the like. Where the optical sheet 23 includes a plurality of sheets, a first sheet may be positioned under the prism sheet 24, and a second sheet may be positioned above the prism sheet 24, but is not limited thereto or thereby.

The structure of the exemplary embodiment of the prism sheet 24 according to the invention will be described in detail through FIGS. 3 and 4.

Figure 3:
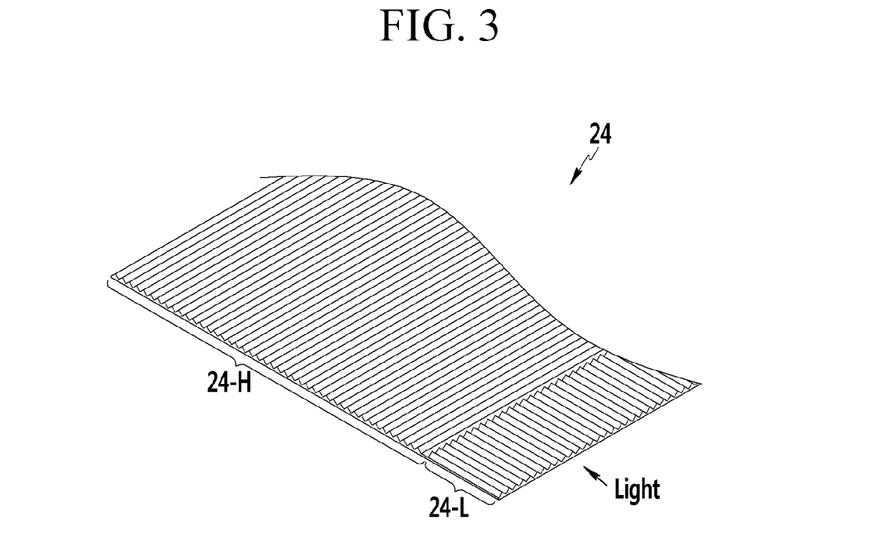
FIGS. 3 and 4 are enlarged views of an exemplary embodiment of a prism sheet according to the invention.
Figure 4:
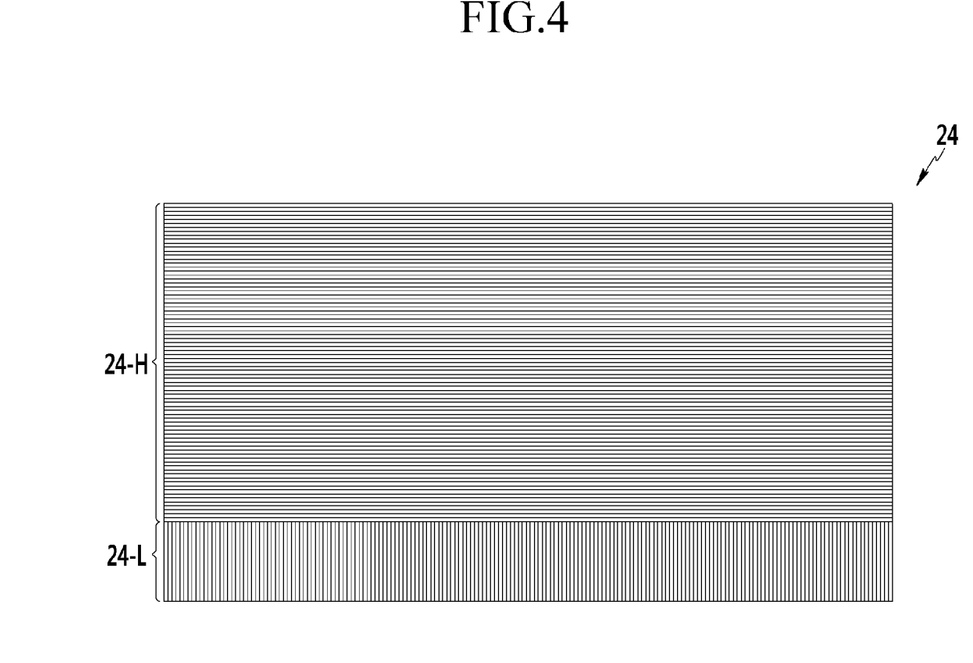

FIGS. 3 and 4 are enlarged views of an exemplary embodiment of a prism sheet according to the invention, FIG. 4 is a top plan view, and FIG. 3 is a perspective view, and FIGS. 3 and 4 show only a portion of the prism sheet.

Referring to FIGS. 3 and 4, the prism sheet 24 includes a first portion 24-H where a prism having a triangular cross-sectional structure is elongated in a first direction, and a second portion 24-L where a prism having a triangular cross-sectional structure is elongated in a second direction that is different from the first direction. A plurality of prisms in the first portion 24-H may be arranged in the second direction, and a plurality of prisms in the second portion 24-L may be arranged in the first direction. The triangular cross-section of the prism may be defined by a base, and two sides extending inclined from the base and meeting at an apex point of the prism. A distance from the apex to the base, and vertical to the base may define a height of the prism in the cross-section, and/or may define a maximum thickness of the prism sheet 24. The first and second portions 24-H and 24-L of the prism sheet 24 may form a single, unitary, indivisible member, but the invention is not limited thereto or thereby.

The backlight unit 500 in the exemplary embodiment of FIG. 1 has a structure that is long in a horizontal direction, and short in a vertical direction as compared to the horizontal direction. As a result, the prism sheet 24 has a structure that is long in the horizontal direction and short in the vertical direction. Referring to FIG. 4, in the first portion 24-H of the prism sheet 24, the first direction in which the prism is elongated is parallel to the horizontal direction. In the second portion 24-L of the prism sheet 24, the second direction in which the prism is elongated is parallel to the vertical direction as compared to the horizontal direction. That is, the second direction is vertical to the light incident side of the backlight unit 500, at which the light source 12 is disposed, among four sides of the backlight unit 500. The second direction is also vertical to the light incident surface of the light guide plate 10 to which the prism sheet 24 is attached.

As shown in FIGS. 1 and 2, in the illustrated exemplary embodiment, the plurality of light sources 12 is arranged in a straight line in the backlight unit 500. That is, when the LCD is viewed by a user (see FIG. 2), the plurality of light sources 12 is positioned to be disposed in a line on a lower side of the LCD.

As described above, where the light sources 12 are arranged in a straight line on the lower portion of the backlight unit 500, a hot spot may occur within a region at a distance of about 2 centimeters (cm) from the light sources

12. That is, the hot spot may be recognized at a position of about 2 cm from the light incident surface of the light guide plate 10, where the light sources 12 are adjacent to the light incident surface of the light guide plate 10. The hot spot occurring in this portion of the backlight unit 500 may be recognized by the user even though the optical sheet 23 is provided between the light guide plate 10 and the user, because light is not uniformly dispersed by the light guide plate 10. Therefore, in the illustrated exemplary embodiment of the invention, prism sheet 24 includes the second portion 24-L in order to disperse light of the hot spot.

That is, the prism disposed in the second portion 24-L of the prism sheet 24 and elongated in the direction vertical to the light incident surface of the light guide plate 10 disperses light provided from the light source 12 adjacent to the light incident side of the backlight unit 500 in left and right directions (e.g., in the first direction) to remove the hot spot where light is condensed.

As described above, the second portion 24-L of the prism sheet 24 is vertical to the light incident surface of the light guide plate 10 and the light incident side of the backlight unit 500 to disperse light that is incident from the light source 12 in directions vertical to a progress direction of the light, thus removing the hot spot. Therefore, an extension direction of the prism positioned in the second portion 24-L is substantially parallel to a progress direction of light provided from the light source 12 (e.g., vertical to the light incident surface of the light guide plate 10). As a result, incident light is dispersed towards the inclined sides of the prism, thus reducing or effectively preventing the hot spot from occurring.

A width in the second direction of the second portion 24-L of the prism sheet 24 may be about 2 cm from the light incident surface of the light guide plate 10 and/or about 2 cm from the light source 12, which corresponds to the region at which the hot spot may occur. The region where the hot spot occurs is described as a region having a width of about 2 cm in the above, but the region may have a larger or smaller width according to an alternative exemplary embodiment.

Further, in the first portion 24-H of the prism sheet 24, the prism is elongated in the horizontal direction of the backlight unit 500. Where the prism is elongated in the horizontal direction, a viewing angle is not decreased at the lateral surface thereof, and thus image display quality is not reduced. That is, if the prism of the first portion 24-H was elongated in the vertical direction of the backlight unit 500, many light rays diagonally progress through the inclined sides of the prism along the first direction, and as a result, there are many light rays having left and right components while light rays pass through the liquid crystal display panel positioned on the upper portion of the backlight unit 500, and thus images viewed from left and right may be different from each other. Therefore, in the exemplary embodiment of the invention, the prism is elongated in the horizontal direction in the first portion 24-H.

Hereinafter, other exemplary embodiments of a prism sheet according to the invention will be described through FIGS. 5 to 10.

FIGS. 5 to 10 are views showing other exemplary embodiments of a prism sheet according to the invention.

The prism sheet 24 of the exemplary embodiments in FIGS. 5 to 10 includes a third portion 24-M positioned between the first portion 24-H and the second portion 24-L, in addition to the first portion 24-H and the second portion 24-L. The first, second and third portions 24-H, 24-L and 24-H of the prism sheet 24 may form a single, unitary, indivisible member, but the invention is not limited thereto or thereby.

Since the directions of the prisms formed on the first portion 24-H and the second portion 24-L are different from each other, luminance of light may be changed at a boundary between the first portion 24-H and the second portion 24-L, and thus the prism sheet 24 includes the third portion 24-M in order to alleviate the change in luminance.

Figure 5:
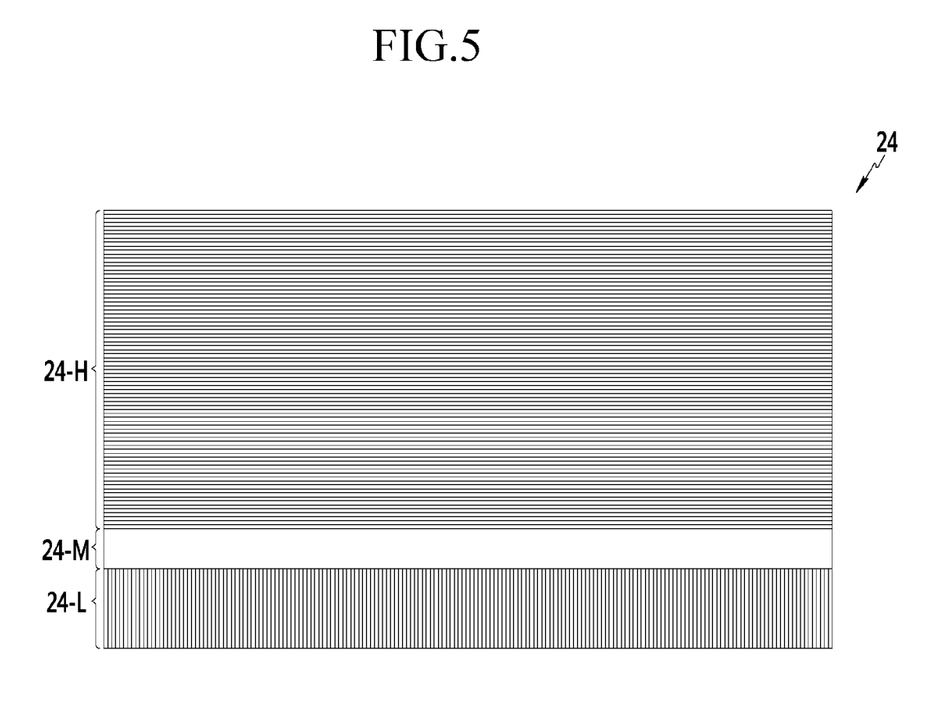
FIGS. 5 to 7 and 9 are views showing other exemplary embodiments of a prism sheet according to the invention.
Figure 6:
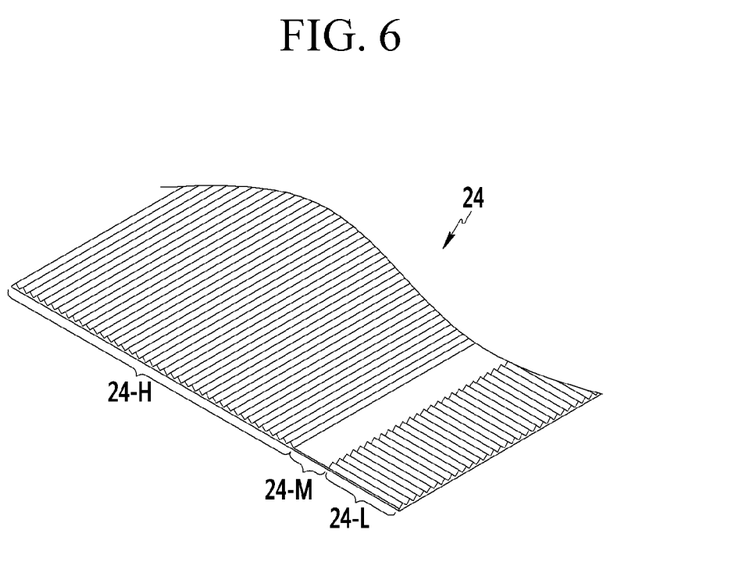

First, an exemplary embodiment of a prism sheet 24 in FIGS. 5 and 6 does not include any pattern, such as the prism. That is, the third portion 24-M may exclude any pattern, such as the prism, and may have a substantially flat or planar upper surface. When light that is incident from the light source 12 has a predetermined level of uniform distribution while passing through the light guide plate 10 and the optical sheet 23, the exemplary embodiment of the prism sheet 24 in FIGS. 5 and 6, may be used. Light incident on a lower surface of the prism sheet 24 passes through the third portion 24-M without a light path thereof being changed such that a luminance difference of light that may occur at the boundary between the first portion 24-H and the second portion 24-L is reduced or effectively prevented.

Figure 7:
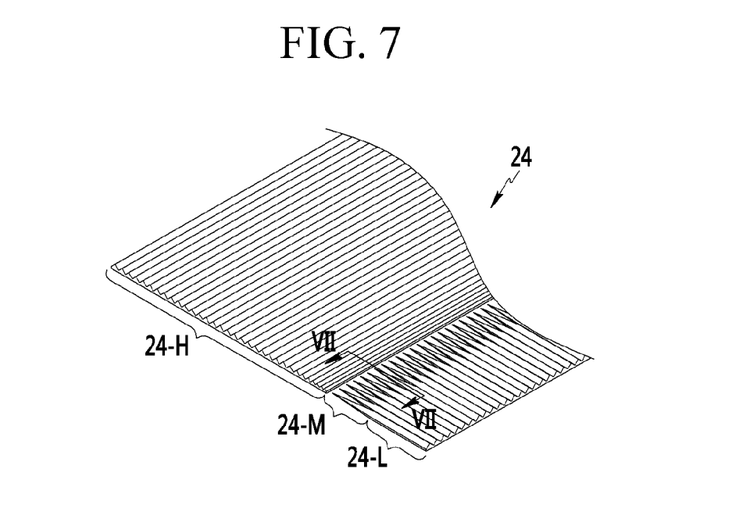
Figure 8:
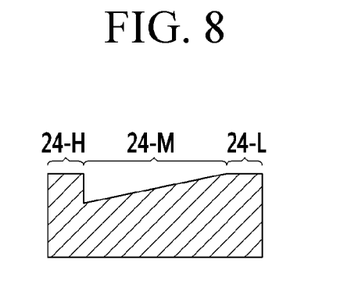
FIG. 8 is a cross-sectional view taken along VII-VII of FIG. 7.

FIG. 8 is a cross-sectional view along VII-VII of FIG. 7. In the exemplary embodiment of FIGS. 7 and 8, the prism sheet 24 has a unidirectionally reduced height at the third portion 24-M of the prism sheet 24. According to the exemplary embodiment of FIGS. 7 and 8, a prism of the second portion 24-L extends into the third portion 24-M, but the cross-sectional height of the prism is reduced in the vertical direction from the second portion 24-L toward the first portion 24-H. The prism of the second portion 24-L may continuously extend into the third portion 24-M, such that the extended prism is a single, unitary, indivisible member, but is not limited thereto or thereby.

The cross-sectional height of the prisms in the first portion 24-H may increase from a minimum height at the boundary between the first and third portions 24-H and 24-M, in the vertical direction, as illustrated in FIG. 7. Referring to FIG. 8, the minimum height of the prisms in the first portion 24-H, may be substantially the same as a maximum height of the prisms in the second portion 24-L, but is not limited thereto or thereby. That is, the cross-sectional height of the prisms in the first portion 24-H may be substantially uniform.

In the prism described above, before the prism structure of the second portion 24-L meets the prism structure of the first portion 24-H, the cross-sectional height thereof is gradually reduced to prevent the boundary between first and second portions 24-H and 24-L from being viewable by a user. As a result, the luminance difference of light that may occur at the boundary between the first portion 24-H and the second portion 24-L is reduced.

Figure 9:
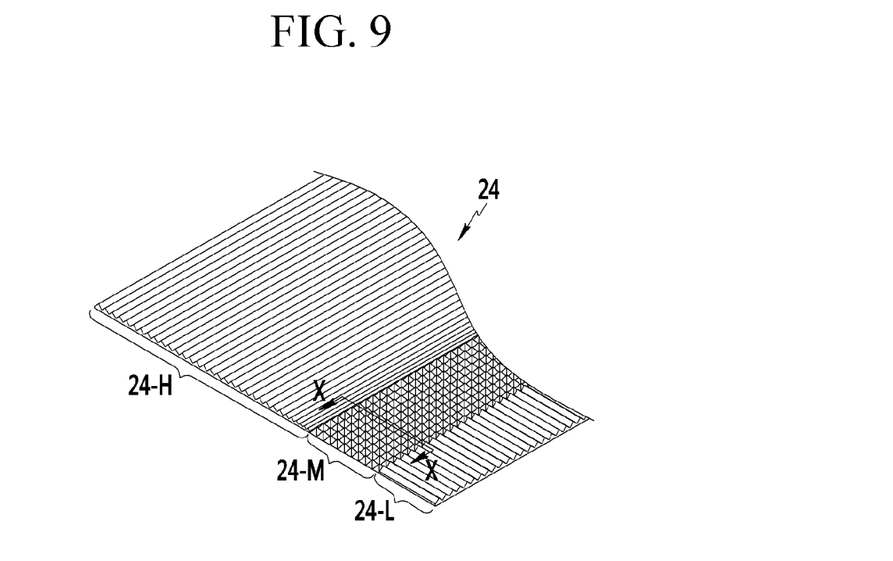
Figure 10:
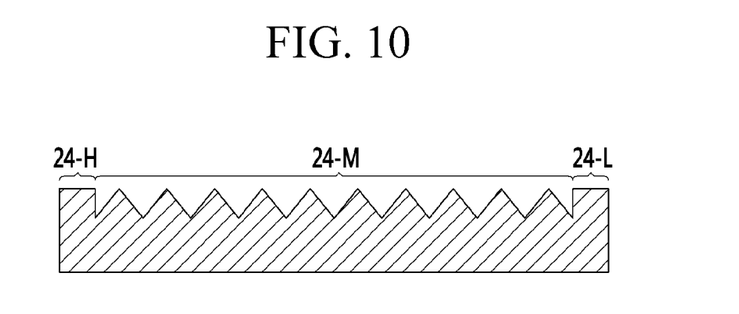
FIG. 10 is a cross-sectional view taken along X-X of FIG. 9

FIG. 10 is a cross-sectional view along X-X in FIG. 9. In the exemplary embodiment of FIGS. 9 and 10, the third portion 24-M of the prism sheet includes a plurality of discrete pyramid structure having a predetermined cross-sectional maximum height arranged both in the horizontal direction and the vertical direction. In a cross-sectional direction, the pyramid structure may be defined by a base, and four lateral sides extending inclined from the base and meeting at an apex point of the pyramid structure. A distance from the apex and vertical to the base may define a height of the pyramid structure. Heights of the pyramid structure in the third portion 24-M, and heights of the prisms in the first and second portions 24-H and 24-L may be substantially the same, but are not limited thereto or thereby. In the plan view, the base may be square-shaped where two sides are parallel to each other and the horizontal direction, and the remaining two sides are parallel to each other and the vertical direction.

Since the plurality of pyramid structures are arranged both in the horizontal direction and the vertical direction, the third portion 24-M has all the optical characteristics of the first portion 24-H and the second portion 24-L. That is, light that is incident on the third portion 24-M is refracted in four directions at lateral surfaces of the pyramid structure, where two directions of the four directions are identical to the directions of light passing through the prism structure of the first portion 24-H, and the other two directions of the four directions are identical to the directions of light passing through the prism structure of the second portion 24-L.

Therefore, if the pyramid structure disposed in the third portion 24-M as shown in FIGS. 9 and 10, light passing through the third portion 24-M has all the optical characteristics of the first portion 24-H and the second portion 24-L, thus reducing the luminance difference of light that may occur at the boundary between the first portion 24-H and the second portion 24-L.

Hereinafter, an exemplary embodiment of a method of manufacturing a prism sheet according to the invention will be described with reference to FIGS. 11 and 12.

Figure 11:
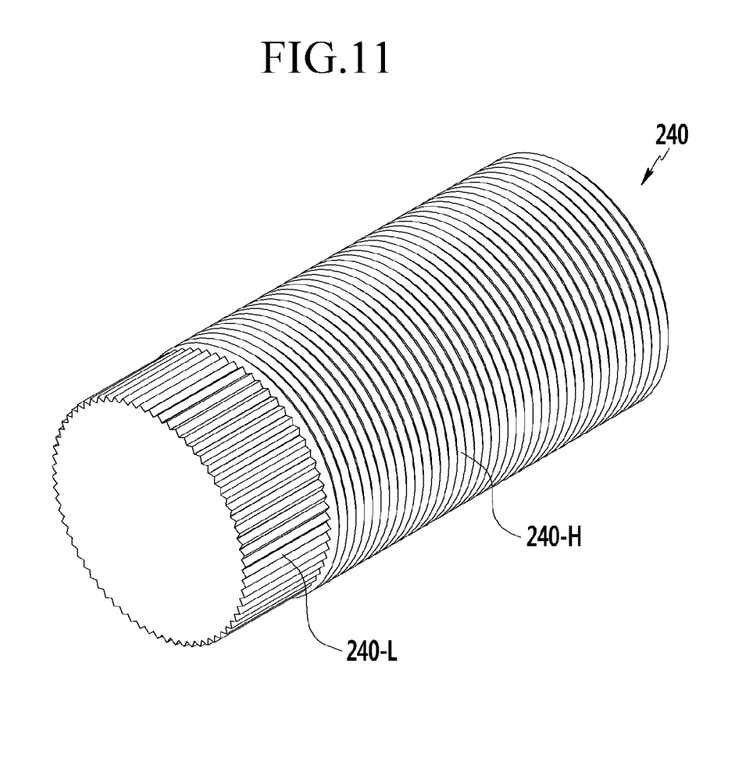
FIG. 11 is a perspective view of an exemplary embodiment of a roller used to manufacture a prism sheet according to the invention.
Figure 12:
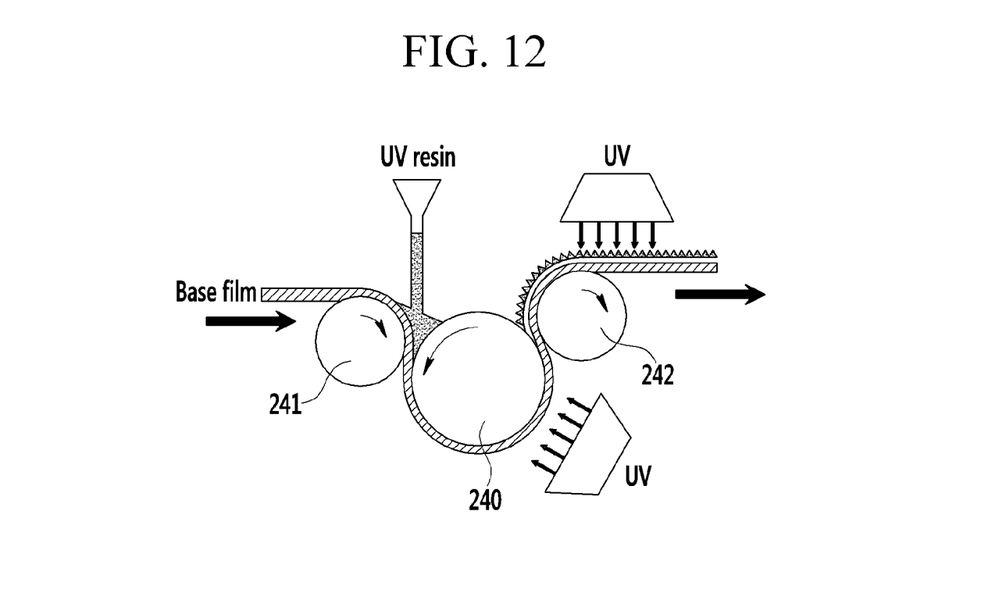
FIG. 12 is a view showing an exemplary embodiment of a method of manufacturing a prism sheet according to the invention.

FIG. 11 is a perspective view of an exemplary embodiment of a roller used to manufacture a prism sheet according to the invention, and FIG. 12 is a view showing an exemplary embodiment of a method of manufacturing a prism sheet according to the invention.

An exemplary embodiment of a method of manufacturing a prism sheet according to the invention includes a process of transferring a pattern of a roller to a film, by using the roller. Such a method is shown in FIGS. 11 and 12.

FIG. 11 shows an exemplary embodiment of a roller 240 for manufacturing the prism sheet 24 of FIGS. 3 and 4, among the prism sheets 24 according to the invention.

The roller 240 includes a first roller portion 240-H corresponding to the first portion 24-H of the prism sheet 24 and a second roller portion 240-L corresponding to the second portion 24-L. It will be understood that a roller having roller portions corresponding to the portions of the prism sheet 24 in FIGS. 5 to 10 may be used to respectively manufacture the prism sheet 24 of FIGS. 5 to 10.

The first roller portion 240-H of the roller 240 generates the prism elongated in the horizontal direction on the prism sheet 24 of FIGS. 3 and 4. The prism of the first portion 24-H of the prism sheet 24 of FIGS. 3 and 4 is intaglioed by the first roller portion 240-H of the roller 240. In FIG. 11, the prism of the first roller portion 240-H is elongated in a rotation direction of the roller 240.

The second roller portion 240-L of the roller 240 generates the prism elongated in the vertical direction on the prism sheet 24 of FIGS. 3 and 4. The prism of the second portion 24-L of the prism sheet 24 of FIGS. 3 and 4 is intaglioed by the second roller portion 240-L. In FIG. 11, the prism of the second roller portion 240-L is elongated along a central axis direction of the roller 240.

The method of manufacturing the prism sheet 24 of FIGS. 3 and 4 by using the roller 240 of FIG. 11 is schematically shown in FIG. 12. It will be understood that a substantially similar process may be used to manufacture the prism sheet 24 of FIGS. 5 to 10, with a respective roller 240 configured according to the prism sheet of FIGS. 5 to 10.

In the exemplary embodiment of FIG. 12, a material such as polyethylene terephthalate ("PET") for a base film is provided between a rotation roller 241 at the left side of FIG. 12 and the roller 240 including a prism pattern, in order to manufacture the prism sheet 24. An ultraviolet ray resin (UV resin) is provided between the material for the base film and the prism pattern of the roller 240. The rotation roller 241 of the left side and the roller 240 including the prism pattern rotate in opposite directions, and thus the material for the base film and the ultraviolet rays resin rotate together along the surface of the roller 240 to transfer the prism pattern into the ultraviolet ray resin.

Ultraviolet rays (UV) are emitted to one side of the roller 240 which transfers the UV resin, while the UV curies the UV resin. Thereafter, the rotation roller 242 of the right side of FIG. 12 rotates in an opposite direction to the roller 240 to separate the patterned UV resin from the base film and form the prism sheet 24. While the prism sheet 24 is separated from the base film, an additional curing process such as by UV or the like may be provided, but the invention is not limited thereto or thereby.

That is, the exemplary embodiment of the method of manufacturing the prism sheet 24 as shown in FIG. 12 may essentially include providing the material for the base film and the ultraviolet ray resin to a first transport roller; transferring a prism pattern on an outer surface of the roller 240 to the ultraviolet ray resin supported by the base film; and radiating ultraviolet rays on the intaglioed ultraviolet resin transferred by the roller 240 to cure the imprinted ultraviolet resin.

Herein, the prism pattern on the roller 240 includes the first roller portion 240-H on which the prism is elongated in the first direction, and the second roller portion 240-L on which the prism is elongated in the second direction that is different from the first direction, where the first direction is parallel to the rotation direction of the roller 240, and the second direction is parallel to the central axis direction of the roller 240.

As described above, the prism pattern may be intaglioed on the roller 240, and may be transferred to the UV resin on the base film, to manufacture the prism sheet 24.

In an alternative exemplary embodiment, where it is difficult to form the intaglioed prism pattern on the roller 240, the prism pattern may be formed by directly molding or scraping a base film, such as by using a frame (e.g., mold) having the prism pattern, without using the roller 240.

Hereinafter, another exemplary embodiment of a backlight unit and a prism sheet different from that of FIG. 1 will be described with reference to FIGS. 13 and 14.

Figure 13:
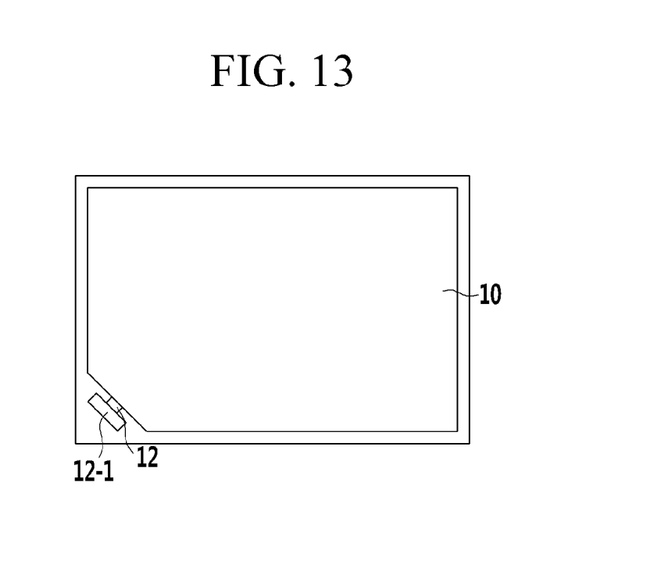
FIG. 13 is a front view of another exemplary embodiment of a backlight unit according to the invention.
Figure 14:
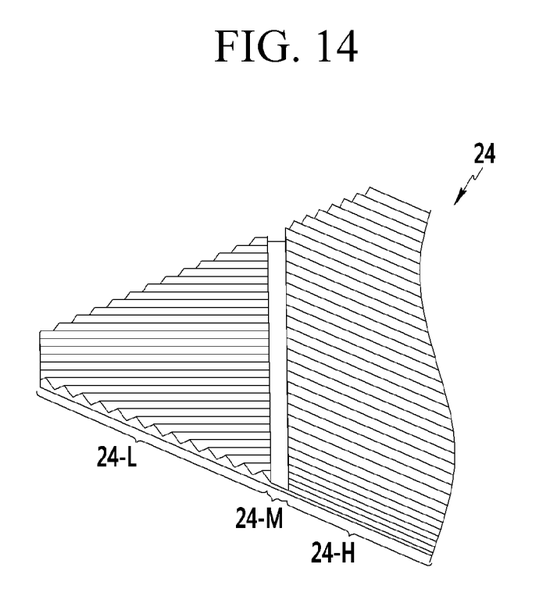
FIG. 14 is an enlarged view of still another exemplary embodiment of a prism sheet according to the invention.

FIG. 13 is a front plan view of another exemplary embodiment of a backlight unit according to the invention, and FIG. 14 is an enlarged view of still another exemplary embodiment of a prism sheet according to the invention.

In the exemplary embodiment of a backlight unit 500 shown in FIG. 13, the light source 12 is positioned adjacent to a corner of the light guide plate 10 as compared to being adjacent to a side of the light guide plate 10 FIG. 2. As a result, light provided from the light source 12 does not progress in the horizontal direction or the vertical direction of the light guide plate 10 and the backlight unit 500, but progresses in a direction that is inclined to the horizontal and vertical direction.

In the exemplary embodiment of FIG. 13, the light guide plate 10 may include a light emitting surface facing the liquid crystal display panel and through which light is transmitted to the liquid crystal display panel, and a surface opposing the light emitting surface. The light guide plate 10 may also include lateral surfaces connected the light emitting surface and the opposing surface to each other. A long lateral surface and a short lateral surface of the light guide plate 10 may not intersect each other, such that an inclined lateral surface may connect these long and short lateral surfaces to each other. In an exemplary embodiment, a corner of the light guide plate 10 may be chamfered to provide the inclined lateral surface which is a light incident surface of the light guide plate 10.

The inclined lateral surface in the lower left side of FIG. 13, but is not limited thereto or thereby.

While the light guide plate 10 is viewable in FIG. 13, it will be understood that the optical sheet 23 and the prism sheet 24 are not necessarily configured to expose the light source 12, but instead, long and short sides of the optical sheet 23 and/or the prism sheet 24 may intersect each other to form a corner portion thereof that overlaps the light source 12.

Since a hot spot may occur at the corner of the light guide plate 10 with respect to the light incident surface, as shown in FIG. 14, the second portion 24-L of the prism sheet 24 should be positioned at a corner portion of the prism sheet 24. Where the prism sheet of FIG. 14 is positioned on the light guide plate 10 and the light source 12, such corner portion of the prism sheet 24 may overlap the light source 12 at the light incident surface of the light guide plate 10.

Further, the prism of the second portion 24-L of the prism sheet in FIG. 14 is elongated vertical to the light incident surface of the light guide plate 10, that is, parallel to a progress direction of light provided from the light source 12. As a result, light is dispersed to both inclined sides of the prism, thus reducing or effectively preventing the hot spot from occurring.

The prism of the first portion 24-H of the prism sheet 24 of FIG. 14 is elongated parallel to the horizontal direction, as shown in FIG. 3. Where the prism is elongated in the horizontal direction, a viewing angle is not reduced at the lateral surface thereof, and thus image display quality is not reduced.

In the exemplary embodiment of FIG. 14, the third portion 24-M is shown between the first portion 24-H and the second portion 24-L. In an alternative exemplary embodiment, the third portion 24-M may be omitted. As described above with reference to FIGS. 5 to 10, the third portion 24-M serves to reduce the luminance difference of light that may occur at the boundary between the first portion 24-H and the second portion 24-L.

The exemplary embodiment of the prism sheet 24 of FIG. 14 may not be easily manufactured by using the roller 240 shown in FIG. 11. Therefore, in an exemplary embodiment, the prism sheet 24 of FIG. 14 may be formed by performing a molding process such a using the frame (e.g., mold) on which the prism structure is intaglioed. Further, according to the exemplary embodiment, each portion of the prism sheet 24 of FIG. 14 may be formed by molding by using the frame for the first portion 24-H and the frame for the second portion 24-L. According to the exemplary embodiment, the prism of the prism sheet of FIG. 14 may be formed by scraping the prism sheet 24 with a protrusion structure such as a bite.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A prism sheet comprising:
an upper surface from which a plurality of prisms is protruded, the upper surface comprising:
a first portion comprising a prism elongated in a first direction in a plan view of the prism sheet; and
a second portion comprising a prism elongated in a second direction different from the first direction in the plan view of the prism sheet,
the second direction perpendicular to a light incident surface of a light guide plate of a backlight unit, and a light source of the backlight unit faces the light incident surface of the light guide plate,
wherein the second portion of the upper surface is disposed between the light incident surface of the light guide plate and the first portion of the upper surface, in the plan view of the prism sheet.

2. The prism sheet of claim 1, wherein:
the backlight unit comprises long sides parallel to each other, and short sides parallel to each other, and
the first direction is parallel to the long sides of the backlight unit.

3. The prism sheet of claim 2, wherein the upper surface further comprises:
a third portion between the first portion and the second portion, in the plan view of the prism sheet.

4. The prism sheet of claim 3, wherein:
the third portion of the upper surface excludes a prism protruded therefrom.

5. The prism sheet of claim 3, wherein:
the prism of the second portion is continuously extended into the third portion, and
a cross-sectional height of the continuously extended prism decreases in a direction from the second portion toward to the first portion.

6. The prism sheet of claim 3, wherein:
the third portion of the upper surface comprises a pyramid structure protruded therefrom.

7. The prism sheet of claim 1, wherein:
the prism sheet overlaps a light emitting surface of the light guide plate.

8. A backlight unit comprising:
a light source which generates light;
a light guide plate which guides the light provided from the light source, through a light emitting surface thereof facing a display panel, and comprises a light incident surface facing the light source; and
a prism sheet between the light guide plate and the display panel,
wherein the prism sheet comprises an upper surface from which a plurality of prisms is protruded, the upper surface comprising
a first portion comprising a prism elongated in a first direction in a plan view of the prism sheet; and
a second portion comprising a prism elongated in a second direction that is different from the first direction, in the plan view of the prism sheet,
the second direction is perpendicular to the light incident surface of the light guide plate,
wherein the second portion of the upper surface is disposed between the light incident surface of the light guide plate and the first portion of the upper surface in the plan view of the prism sheet.

9. The backlight unit of claim 8, wherein:
the backlight unit comprises long sides parallel to each other, and short sides parallel to each other, and
the first direction is parallel to the long sides of the backlight unit.

10. The backlight unit of claim 9, wherein the upper surface of the prism sheet further comprises:
a third portion between the first portion and the second portion, in the plan view of the prism sheet.

11. The backlight unit of claim 10, wherein:
the third portion of the upper surface excludes a prism protruded therefrom.

12. The backlight unit of claim 10, wherein:
the prism of the second portion is continuously extended into the third portion, and
a cross-sectional height of the continuously extended prism decreases in a direction from the second portion toward the first portion.

13. The backlight unit of claim 10, wherein:
the third portion of the upper surface comprises a pyramid structure protruded therefrom.

14. The backlight unit of claim 10, further comprising a plurality of light sources arranged in a line which is parallel to a long side of the backlight unit.

15. The backlight unit of claim 10, wherein:
the light incident surface of the light guide plate is inclined at a corner portion thereof.

16. The backlight unit of claim 8, further comprising:
a reflection sheet which is under the light guide plate and reflects the light toward the light guide plate.

17. The backlight unit of claim 8, wherein:
the light incident surface of the light guide plate is inclined at a corner portion thereof.

18. The backlight unit of claim 17, wherein:
the backlight unit comprises long sides parallel to each other, and short sides parallel to each other, and
the first direction is parallel to the long sides of the backlight unit.

19. The backlight unit of claim 18, wherein:
the upper surface of the prism sheet further comprises:
a third portion between the first portion and the second portion, in the plan view of the prism sheet,
the third portion excluding a prism protruded therefrom.

* * * * *